(12) United States Patent
Elkind

(10) Patent No.: US 8,960,187 B1
(45) Date of Patent: Feb. 24, 2015

(54) CONCENTRATING SOLAR ENERGY

(75) Inventor: Jerome Lee Elkind, Dallas, TX (US)

(73) Assignee: Stellar Generation, LLC, Dallas, TX (US)

( * ) Notice: Subject to any disclaimer, the term of this patent is extended or adjusted under 35 U.S.C. 154(b) by 786 days.

(21) Appl. No.: 13/189,282

(22) Filed: Jul. 22, 2011

Related U.S. Application Data

(60) Provisional application No. 61/367,255, filed on Jul. 23, 2010.

(51) Int. Cl.
*F24J 2/12* (2006.01)

(52) U.S. Cl.
USPC ............. 126/690; 126/688; 126/689; 248/94; 248/346.5; 248/678; 248/688

(58) Field of Classification Search
USPC .............. 126/688–690; 248/94, 188.7, 346.5, 248/676, 678, 688
See application file for complete search history.

(56) References Cited

U.S. PATENT DOCUMENTS

| | | | | |
|---|---|---|---|---|
| 3,234,550 A | * | 2/1966 | Thomas | 343/912 |
| 3,235,872 A | * | 2/1966 | Schepis | 343/912 |
| 4,243,301 A | * | 1/1981 | Powell | 359/847 |
| 4,252,107 A | * | 2/1981 | Horton | 126/605 |
| 4,281,641 A | * | 8/1981 | Devore | 126/605 |
| 4,340,031 A | * | 7/1982 | Niedermeyer | 126/600 |
| 4,416,262 A | * | 11/1983 | Niedermeyer | 126/690 |
| 4,423,926 A | * | 1/1984 | Stolpin | 359/853 |
| 4,585,317 A | * | 4/1986 | Hodges et al. | 359/852 |
| 4,881,998 A | * | 11/1989 | Youngkeit | 156/173 |
| 5,032,016 A | * | 7/1991 | Youngkeit | 359/853 |
| 5,658,448 A | * | 8/1997 | Lasich | 205/628 |
| 5,973,825 A | * | 10/1999 | Lasich | 359/353 |
| 2006/0048808 A1 | * | 3/2006 | Ruckman et al. | 136/206 |
| 2007/0274905 A1 | * | 11/2007 | Wynn | 423/658.2 |

FOREIGN PATENT DOCUMENTS

ES 1071351 U * 2/2010

* cited by examiner

*Primary Examiner* — Jorge Pereiro
(74) *Attorney, Agent, or Firm* — Fish & Richardson P.C.

(57) ABSTRACT

The present disclosure is directed to concentrating sunlight. In some implementations, a concentrator includes a plurality of reflector support structures and a plurality of reflector segments associated with each reflector support structure. Each reflector support structure formed to include a curved surface that receives an associated reflector segment and a bottom portion that distributes the weight of the reflector segment along a surface area. Each reflector segment includes a reflecting surface adjacent a flexible element such that the reflecting surface reflects incident sunlight light. In some examples, the reflector support structures may comprise a light weight material such as a polyurethane and/or the reflecting surface may be 5 mils or less.

12 Claims, 6 Drawing Sheets

CONCENTRATING SOLAR ENERGY

CLAIM OF PRIORITY

This application claims priority under 35 USC §119(e) to U.S. Provisional Application No. 61/367,255, filed Jul. 23, 2010, the entire disclosure of which is incorporated herein by reference.

TECHNICAL FIELD

This invention relates to electromagnetic radiation and, more particularly, to concentrating solar energy.

BACKGROUND

In the alternative energy field, solar energy holds great promise because it is inherently clean and abundant. Though, solar energy is spatially diffuse so harvesting sunlight poses many technical problems. For example, even in the deserts of the United States, little more than 1 kilowatt of solar energy is present per square meter in the summer. As a result, solar energy utilization schemes typically employ a light collection system that covers a large area. Depending on the nature of this light collection system, solar energy systems frequently become cost prohibitive due to the amount of collection material needed. Additionally, in order to achieve the greatest collection efficiency, light collection systems are generally designed to capture light while the sun changes location in the sky such as by tracking the movement of the sun or utilizing redundant static elements aimed in different directions to enable sufficient collection throughout the day.

Solar energy is commonly converted directly to electricity using photovoltaic (PV) panels. Even though the overall cost of these systems is not competitive with conventional power plants and even though the electricity generated, which is naturally periodic in nature, is not readily stored, the use of solar panels is growing as a result of government subsidies and the ability to push excess power onto the existing power grid, reducing conventional power generation needs. This last capability associated with using the existing grid for "storage" is a way for solar PV systems to side step the problem of storage, but it currently requires the presence of a dominant fuel driven grid.

One way to get around thermal or electrical energy storage issues is to use solar energy to produce a fuel. For example, renewable electricity generated from a solar photovoltaic system may be used to perform electrolysis of water to create a fuel, i.e., hydrogen, which can be stored and transported. Unfortunately, approximately 60 kiloWatt-Hour (kW-Hr) of energy is required to electrolyze enough water to generate 1 kg of hydrogen and because electricity, and in particular renewable electricity, is so expensive water electrolysis is uncompetitive as a process for fuel production.

Another method for utilizing solar energy involves using sunlight to drive a thermal process. One such thermal process involves concentrating the sunlight to heat a fluid which, in turn, can be used to make steam that drives a turbine and make electricity. Except for the fact that it is somewhat possible to store hot fluid for off-cycle power generation, this method lacks a flexible storage method that would allow transportation and later use of the stored energy.

Another type of thermal process uses sunlight to heat a reactor and thereby drive a chemical reaction that produces a fuel, which may be more easily stored and transported. This process may be an effective way to remove the natural periodicity from solar energy production, but, depending on the details of the chemical process that is used to produce the fuel, the required temperatures may be high, necessitating a strong solar concentrator such as a high quality parabolic dish. Traditionally, these have been expensive to produce.

SUMMARY

The present disclosure is directed to concentrating sunlight. In some implementations, a concentrator includes a reflector body formed from a single element, or multiple segments combined into a single reflector, whose substrate material is relatively low cost such as a thin plastic material. In addition, the substrate may include, in the absence of external forces, a substantially parabolic surface coated with a thin reflective surface. The reflector body may be supported by, connected to, or otherwise abut surfaces of a plurality of reflector support structures. For example, the reflector body may be substantially parabolic and abut parabolic surfaces of the support structures, where the reflector support structures serve to support the parabolic shape of the reflector body against external forces that would otherwise alter its shape. In these instances, the support structures may enable the reflector body to be much thinner and thereby lower-cost relative to conventional parabolic structures that are typically thick enough to be to be self-supporting. As previously mentioned, a concentrator or reflector may include a plurality of reflector segments, which together effectively form an optical system that is comparable to that formed using a single parabolic reflector. Again in this example, each very thin and low-cost reflector segment is supported by 1 or more reflector support structures, which are formed to include a surface that matches and thereby supports a surface of the reflector element and a bottom portion that distributes the weight of the reflector element along a surface area. Each reflector element includes a reflecting surface adjacent to a properly formed parabolic substrate such that the reflecting surface focuses reflected incident sunlight light in a manner that provides sufficient light concentration. In some examples, the reflector support structures may comprise a light weight material such as plastic and/or the reflector body may be 100 mil, less thick, or thicker. For example, the reflector body may be molded, thermoformed or otherwise formed from a planar material with a thickness of about 90 mil or less.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
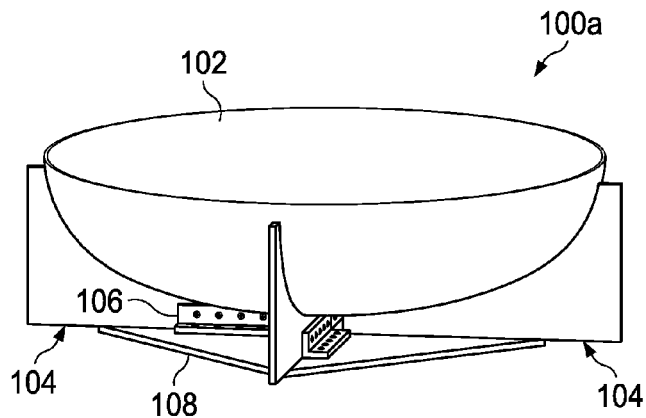
FIGS. 1A-C are different views of a concentrator and a view of the support structure in accordance with some implementations of the present disclosure.
Figure 1B:
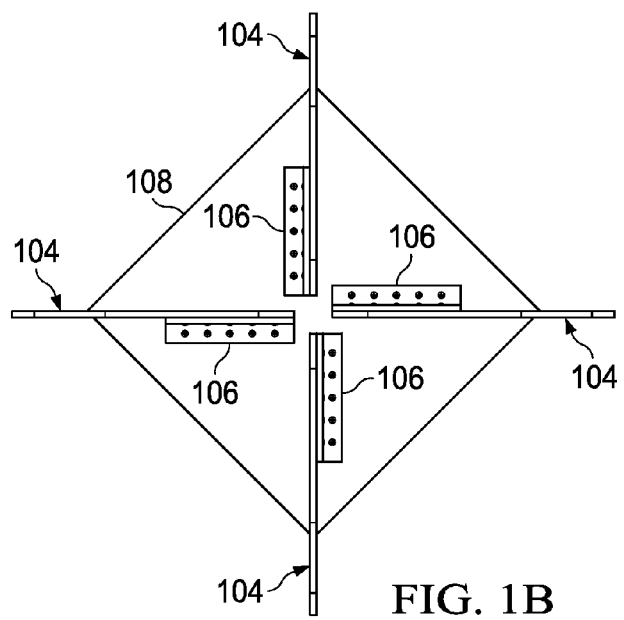
Figure 1C:
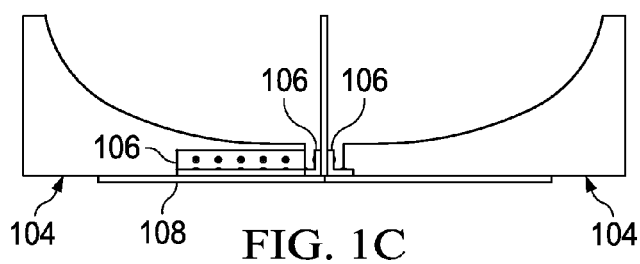

FIGS. 1A-1C are drawings illustrating an example concentrating system 100 for concentrating incident sunlight. For example, the system 100 may focus solar energy to generate sufficient heat to dissociate water into hydrogen and oxygen. In other words, the thermal energy that can break apart or otherwise dissociate water molecules can be generated, in some implementations, by concentrating sunlight using the system 100. In these instances, the concentrating system 100 may produce a fuel, such as hydrogen, in a substantially clean and abundant manner. Using thermal energy from the sun directly to produce fuels avoids the inefficient and expensive light-to-electricity conversion that exemplifies solar photovoltaic systems. The concentrating system 100 may, in these instances, produce very high temperatures (e.g., 2000° C. or greater), depending on the thermodynamic parameters such as the feedstock, the final shape of the reflector element after assembly, the reflective material, and/or others. In order to produce these very high temperatures, the system 100 may concentrate the sunlight down to a relatively small area. For example, the system 100 may concentrate the sunlight by a factor of about 1000 or greater. In addition, the concentrating system 100 may be used to directly generate electricity by focusing or otherwise concentrating the spatially diffuse sunlight (e.g., about 1 kilowatt of solar energy per square meter) onto a sterling engine. In some implementations, the system 100 may include one or more of the following: relatively light and inexpensive support structure (e.g., plastic); a thin and inexpensive reflector element; simple manufacturing processes; thin films for reflecting surfaces; and/or other features. For example, while a standard PV Solar Panel typically collects 17 square feet ($ft^2$) of sunlight at a cost of $300-$500 USD and weights about 40 lb, a similarly sized reflector that is described here and made from $\frac{1}{16}$" thick acrylic might weight about 6.5 lbs and cost only $30 USD owing to the relatively low cost of thin plastics, thin film metallization and molding or thermoforming. In other words, the system 100 may cost 10 times less for collecting the same amount of solar energy as compared with PV solar panels. By including one or more of these features, the system 100 can, in some implementations, minimize, decrease, or otherwise reduce costs of a solar energy system and may make such renewable systems competitive with conventional power plants. In addition, the advantage associated with designing the light collection system to be a small portion of the overall cost of solar power utilization is that it allows such systems to be constructed economically even in regions where the solar insolation is not the strongest.

In the illustrated implementations, the system 100 includes a reflector element 102 coupled to a plurality of reflector support structures 104. The system 100 may include brackets 106 for attaching the reflector support structures 104 to the support base 108, and may use, for example, small nails, tacks, rivets, or other temporary and/or permanent fasteners to attach the reflector element 102 to the reflector support structures 104. Alternatively or in combination, the reflector element 102 may be bolted at its center point directly to the base 108 and thus held against the reflector support structures 104, but not permanently attached to them. The reflector element 102 reflects incident sunlight to a focal point and/or area, and the reflector support structures 104 support the reflector element 102. The reflector support structures 104 serve to help the reflector element 102 maintain a substantially parabolic shape that enables the reflecting surface to concentrate light sufficiently and thereby allowing them to be formed from very thin and inexpensive materials. In addition while not shown in FIG. 1, it is within the scope of this construction to position a soft cushion between the reflector element 102 and the reflector support structure 104. The support base 108 may provide additional stability and/or support for the system 100. For example, the base plate 108 and fasteners (e.g., angle iron brackets) may substantially fix the reflector support structures 104 in space and the reflector support structures 104 may include curved surfaces that substantially support the reflector element to maintain a specified shape.

The reflector element 102 is configured to reflect incident sunlight to at least a focal area. For example, the reflector element 102 may form a substantially parabolic mirror that concentrates incident sunlight to a focal point or area. As previously mentioned, the reflector element 102 may concentrate incident sunlight 1000 times or greater. In some implementations, the reflector element 102 may include a reflective thin film adjacent to a thin and low-cost material. For example, the reflector element 102 may include a thin aluminized mylar film affixed to a thin polycarbonate sheet. By using these materials, the cost for concentrating sunlight is many times less (e.g., 10 times) than using conventional parabolic mirrors with optical quality sufficient to achieve some of the highest concentration factors. In general, the reflector segment 102 may include a thin substrate, such as a sheet of polycarbonate that is 10 to 50 mil thick. In some instances, the thin and low-cost substrate may be off-the-shelf material or otherwise readily available commercial material. While the illustrated implementation has an inner and an outer surface that is parabolic, the reflector segment 102 may be include only a single parabolic surface such that the reflector support structures 104 abut a surface that is non-parabolic. Also, reflector element 102 may be made up of multiple smaller pieces to allow for the most economical use of substrate materials. By combining thin and low-cost material with the supporting structures 104, the reflector element 102 may have sufficient support to substantially withstand deformation from winds and/or gravity to substantially maintain the shape of the reflective material. In some implementations, the reflective material may be applied to a surface of the reflector segment 102 by lamination and/or physical vapor deposition accomplished by one or more commercially available processes. For example, a reflective surface, such as metalized mylar, may be laminated to the thin and low-cost substrate. Similarly, the reflective film may be directly deposited onto the substrate by, for example, evaporation or sputtering or some other physical vapor deposition method. In some implementations, the reflective material may be affixed to the flexible substrate prior to or following forming a parabolic reflective surface. In addition, the reflective film may include a coating that is designed to protect the metal from physical damage or chemical attack. In some implementations, the reflector element 102 can be molded to the proper shape by a number of methods including, for example, blow molding, free molding, injection molding and/or thermoforming. The aluminized mylar and the polycarbonate are used for example purposes only and the reflector element 102 may use other thin films and/or materials without departing from the scope of this disclosure. For example, the reflector element 102 may be molded from a thin low cost, specular substrate material such as acrylic or others. Additionally, other reflective metals could be used such as silver. In addition, the reflective material may be applied to either the concave or convex surface of the reflector element 102. If applied to the convex surface, the reflector material 102 may operate as a protective top coating for the reflective material. In addition, in the case of depositing a reflective coating on the convex surface, the reflector element 102 may be substantially transparent to sunlight.

By constructing each reflector element 102 using a relatively thin substrate, the overall weight of the reflecting surface may be minimized or otherwise reduced. For example, a 50 square foot reflector that is made from 30 mil thick polycarbonate may weight only about 9.3 pounds. By using properly formed reflector support structures, which can, themselves, be very thin, light and inexpensive, to provide the support to substantially maintain that shape, we may produce a robust, yet, cost effective reflector with excellent optical performance. For example, a typical solar panel has an area of 1.6 m$^2$ or 17 ft$^2$ and weighs about 41 lb. To collect the same amount of sunlight using 17 ft$^2$ of 1/16" thick acrylic, the weight of that plastic would be 6.6 lbs or 6.5 times lighter excluding the weight of the support structures. Regarding cost, that same 17 ft$^2$ acrylic solar collector might cost only about $30 to manufacture. In some implementations, the cost per collection area for the reflector element 102 can be 15 times less than a solar panel.

Reflector support structures 104 are configured to support the reflective element 102 and help the substantially-parabolic surface of the reflective element 102 maintain a parabolic shape even when gravity and windforces would otherwise cause and an alteration of the shape of the reflector and a defocusing of the light rays. For example, the reflector support structures 104 may include a curved surface that is substantially parabolic such that when the segments are attached to the curved surface the reflector elements 102 they remain substantially parabolic along the length of the curved surface even when they experience forces that would otherwise distort them. In some implementations, the reflector support structures 104 may include surfaces with different shapes in some implementations when the outer surface of the reflective element 102 is non-parabolic (e.g., round, square). In some implementations, the reflector support structures 104 may be approximately triangular with a bottom surface, a curved surface, and a height that forms the endpoint of the curved surface. The reflector support structures 104 may be relatively thin (e.g., approximately 1/4" to 1/2 " or possibly thinner). The thickness of the reflector support structure 104 may be based, at least in part, on the process used to connect the reflector element 102 to the reflector support structures 104 and/or on being strong enough to support the reflector element 102 against up-and-down and/or side-to-side motion, which may substantially maintain the shape of the reflective material and may substantially maintain its effectiveness. In some implementations, the thickness of the reflector support structures 104 can be based on an ability to allow for solid attachment to reflector elements 102, as illustrated.

As for manufacturing, the reflector support structures 104 may be molded, cast, cut, routed, or otherwise produced from bulk material. For example, the reflector support structures 104 may be formed using PVC and a mold. Attachment of the reflective segments to the surface of the reflector support structures 104 may be permanent such as using nails, adhesive, rivets, and/or others, and/or the connections may be in part temporary such as a hook-and-loop connections. Temporary attachments may facilitate replacement of damaged reflector segments 102 and/or reduce the wind-load specification if the reflector segments 102 are designed to tear away in high winds. In the latter case, the reflector element 102 may be reattached after the period of high winds has passed. In some implementations, a substantially conforming cushion may be used between the reflector element 102 and reflector support structures 104 to help minimize or otherwise reduce effects due to differences between coefficient of thermal expansions of, for example, the reflector support structures 104 and the reflector element 102. By shaping a very thin plastic sheet to a substantially parabolic shape to form a reflector element 102 and by supporting that "dish" with reflector support structures 104 that have substantially the same shape, one may reduce weight and/or cost in the solar collector, relative to one that is substantial enough to be self-supporting, while still maintaining the optical quality of the system 100.

Base plate 108 may be configured to, in turn, support the combined weight of the reflector support structures 104 and the reflector segments 102. For example, the base plate 108 may be substantially flat and strong enough to maintain its flat shape while supporting the segments 102 and the reflector support structures 104. The reflector support structures 102 may be fixed to the base plate 108 using permanent and/or temporary fasteners. For example, an angle iron or similar connection of the reflector support structures 104 to the platform may be a convenient and inexpensive method to fix the reflector support structures in space accurately. Such a bracket may ensure or otherwise assist in maintaining the perpendicularity of the reflector support structures 104 to the base 108. In addition, these example implementations may allow the reflector support structures 104 to be narrow (e.g., approximately 1/4" to 1/2 " or possibly thinner) because the reflector support structure thickness may not substantially affect the perpendicularity of the reflector support structure 104 relative to the base plate 108. In some implementations, the base plate 108 can have at least one surface that is substantially planar to a bottom surface of the reflector support structures 104 and attached using, for example, angle iron brackets. The area of the base plate 108 may be much smaller than the dish diameter, which may reduce costs and/or mass. The base plate 108 may be large and thick enough to support the rest of the structure without substantially bending. For example, a dish that is 8 feet in diameter may use a square base plate that is 4 foot on a side and 1/2 inch thick. Some methods of attaching the reflector material may include, for example, one or more of the following: (1) deposited by evaporation after, for example, a vacuum molding process; (2) applied in thin adhesive backed strips after, for example, the vacuum molding; and/or (3) applied by lamination or evaporation to the flat sheet before, for example, vacuum molding.

Figure 2:
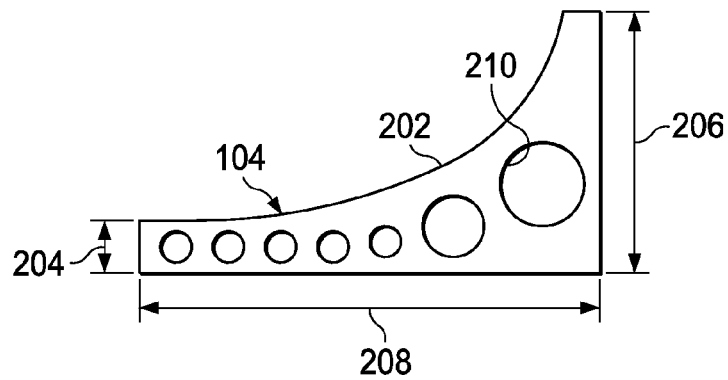
FIG. 2 illustrate an example reflector element of FIG. 1.

FIG. 2 is an example reflector support structure 104 in accordance with some implementations of the present disclosure. In the illustrated implementation, the perimeter of the reflector support structure 104 is substantially trapezoidal with one side being curved. In particular, the illustrated reflector support structure 104 includes a curved surface 202, a first height 204, a second height 206, and a width 208. The curved surface 202 may be any curved surface in accordance to the specification. For example, the surface 202 may form a monotonically increasing curve such as a parabolic curve along the width 208. The curved surface 202 spans from a top of the first height 204 to a top of the second height 206 where the first top and the second top are at different heights. The width 208 supports the reflector support structure 104 and any attached reflector element 102 by distributing the weight along a surface adjacent the width 208. For example, the width 208 may be attached to and distribute the weight to the base plate 108. In addition, the reflector support structure 104 may include holes 210. The holes 210 may decrease manufacturing supplies and, as a result, may decrease the cost, wind load, and/or weight of the reflector support structure 104.

Figure 3A:
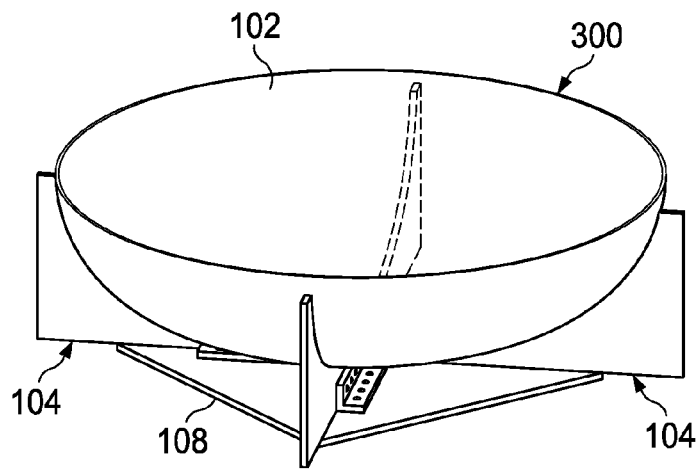
FIGS. 3A and B illustrate examples of reflector elements formed in a single piece and formed by combining multiple segments, respectively.
Figure 3B:
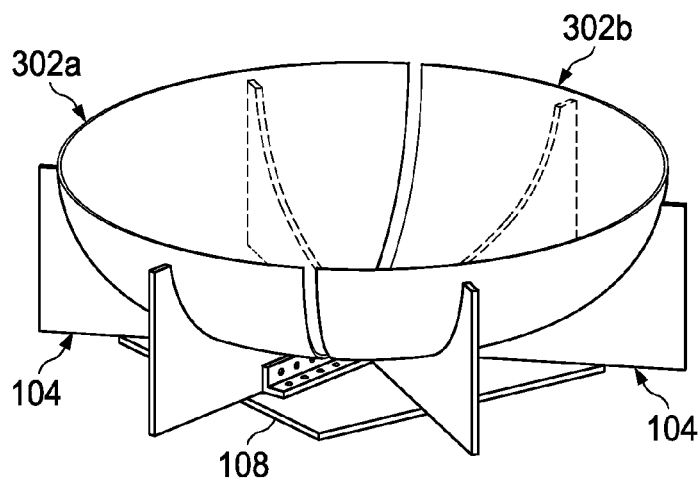

FIGS. 3A-3B are a drawing that shows how reflector segments 302, which have been molded into the substantially parabolic shape may be assembled to form a complete dish, where the reflector segments are, again, very thin, but already have the substantially parabolic shape and are supported by the reflector support structures 104, which also may substantially the same shape as the reflector segments. Once again, this method may allow the solar collector to be substantially light weight and low cost while still maintaining a substantially parabolic shape and excellent optical quality. Forming the reflector element 102 from multiple reflector segments 302 can allow for ease of manufacture and possibly lower tooling costs, depending on the molding method employed.

Not addressed directly in this disclosure are the additional elements used to provide tracking, which has not been a critical element in the manufacturing cost. But it should be noted that the small size and light weight of this design may allow the use of smaller motors and gears which will help reduce cost.

Figure 4:
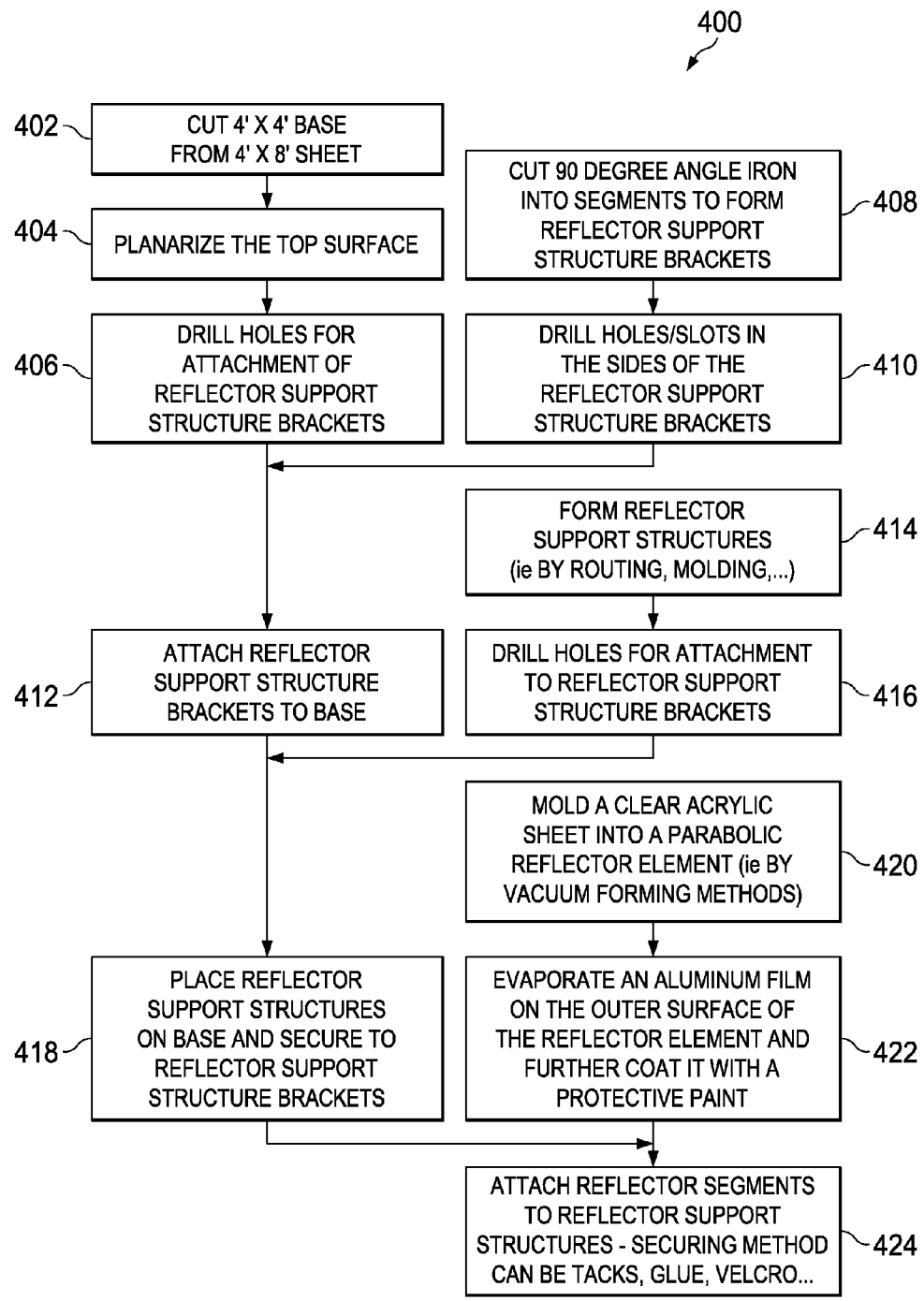
FIG. 4 is a flow chart illustrating an example method for manufacturing a solar concentrator.

FIG. 4 is a flow chart illustrating an example method 400 for manufacturing a solar concentrator in accordance with some implementations of the present disclosure. The illustrated methods are described with respect to system 100 of FIG. 1, but this method could be used by any other suitable system. Moreover, the system 100 may use any other suitable techniques for manufacturing the system 100. Thus, many of the steps in this flowchart may take place simultaneously and/or in different orders as shown. System 100 may also use methods with additional steps, fewer steps, and/or different steps, so long as the methods remain appropriate.

At a high level, method 400 includes the following processes: (1) base plate manufacturing in steps 402 to 406; (2) reflector support structure manufacturing and assembly 408 to 418; and (3) reflector segment manufacturing 420 to 424. Method 400 begins at step 402 where a 4'×4' base is cut from standard 4'×8' stock material. For example, the base plate 108 may be cut from ¾" thick pressure treated plywood. At step 404, the top surface of the plate may be planarized based on one or more parameters. In the example, the base plate 108 may be planarized to provide a substantially flat surface to which the reflector support structures 104 may be attached. Next, at step 406, holes are drilled for reflector support structure support brackets. Again in the example, holes may be drilled in the planarized base plate 108 for attaching fasteners. Turning to the reflector support structure process, 90° angle iron is cut into segments to manufacture reflector support structure support brackets at step 408. At step 410, holes and/or slots are formed in the reflector support structure support brackets. Next, at step 412, the reflector support structure support brackets are attached to the base plate. The reflector support structures are formed at step 414 by, for example, by casting or by injecting plastic into a mold and allowing the plastic to harden in accordance with the predefined shape. At step 416, holes are drilled into the reflector support structures for attaching to the reflector support structure support brackets (or they could have been molded in place.) Next, at step 418, the reflector support structures are placed on the base plate and attached to the reflector support structure support brackets. As for the example, the reflector support structures 104 may be attached to the base plate 108 using any suitable fasteners such as angle iron. Turning to the reflector segment process, clear acrylic sheet is molded to form a substantially parabolic shape at step 420. In the example, acrylic sheet that is 0.09 inches thick may be used to form the reflector element 102. At step 422, the reflector element 102 has a 3000 angstrom film of aluminum evaporated on the convex surface to create a second surface reflector and this is then coated with a protective paint to insulate the thin metal film from the air and moisture which could otherwise oxidize the aluminum film and reduce its reflectivity. Next, at step 424, the reflector element 102 is attached to the reflector support structures 104.

Figure 5A:
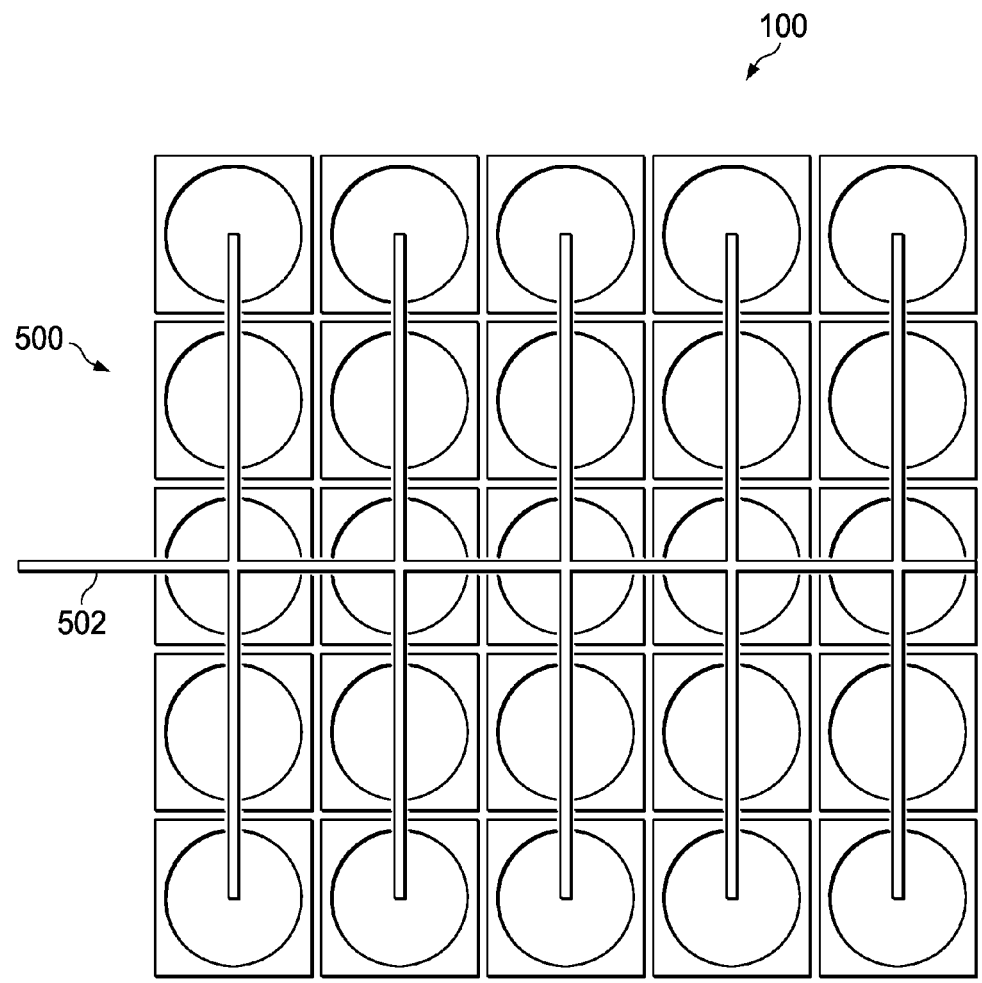
FIGS. 5A-C are block diagrams illustrating arrays of solar concentrators.
Figure 5B:
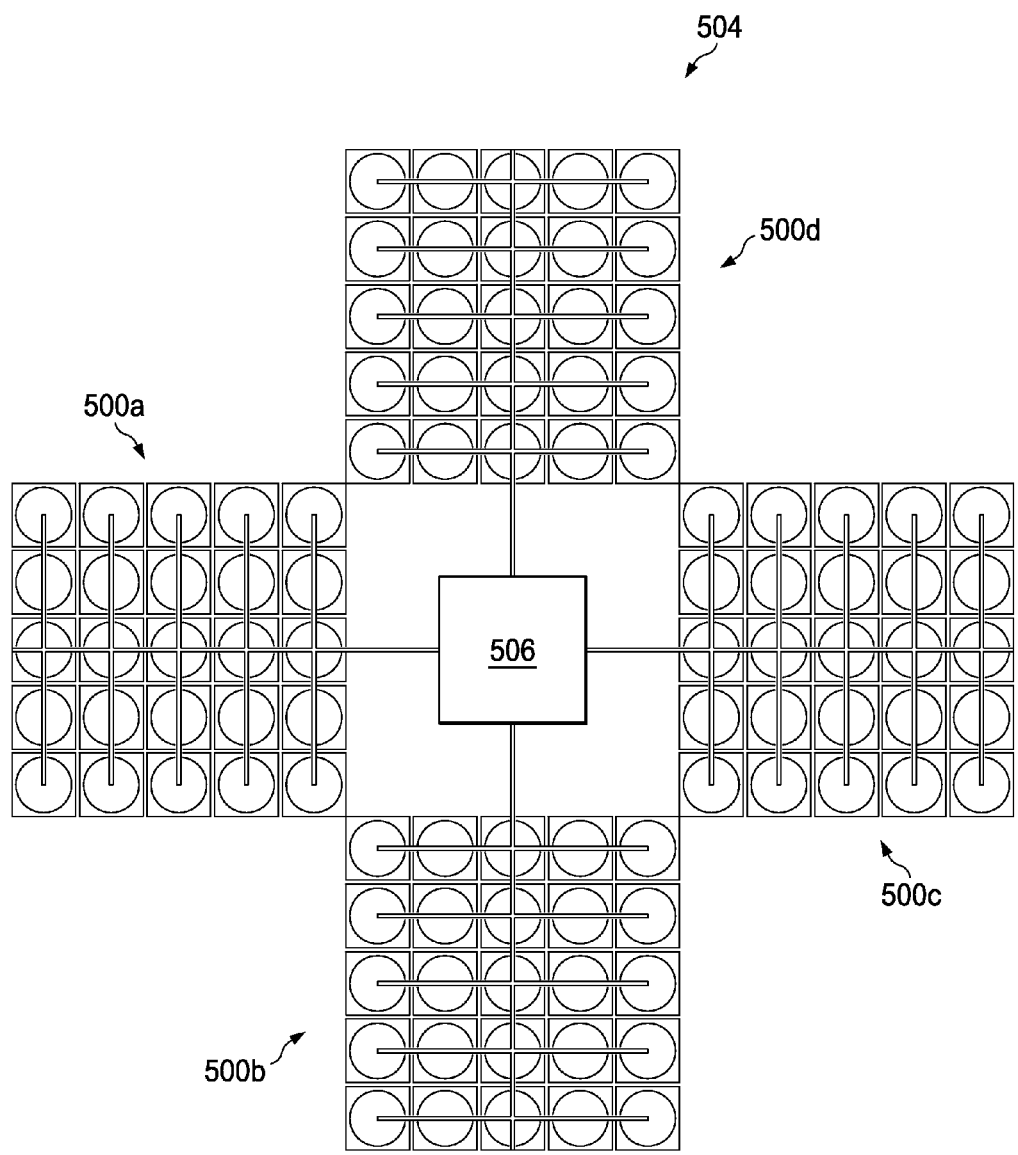
Figure 5C:
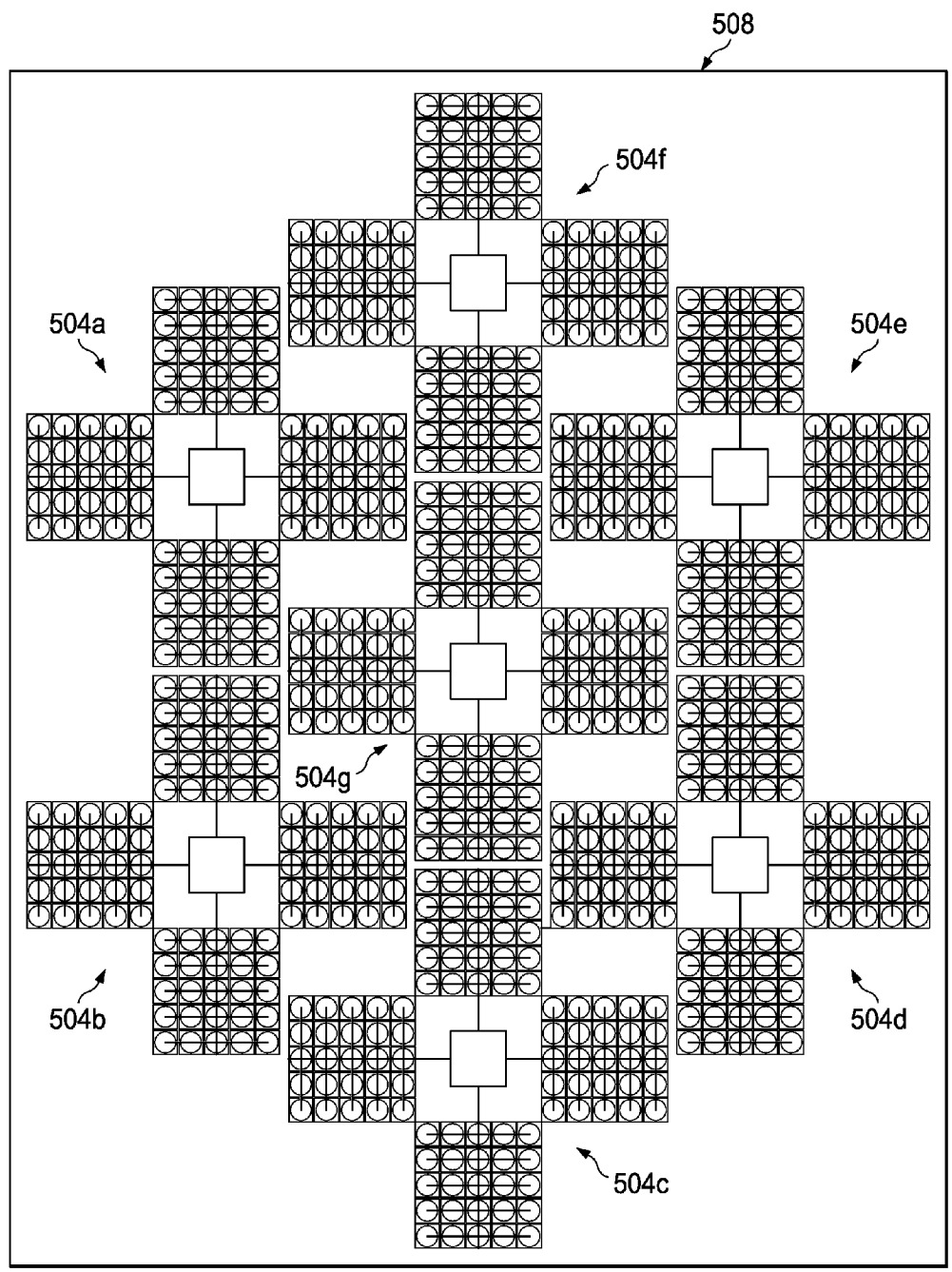

FIGS. 5A-C illustrate example arrays of solar concentrators 100 in accordance with some implementations of the present disclosure. Referring to FIG. 5A, the array 500 includes a plurality of solar concentrators 100 spatially arranged in a two-dimensional pattern. In particular, the concentrators 100 are connected in parallel by conduit 502 to bring reactant material to the concentrator, to bring product materials from the concentrators and to provide other services to the concentrators such as power for the tracking mechanism and logic control signals. In the illustrated implementation, rows of concentrators 100 may share a single section of conduit 502. FIG. 5B illustrates a system 504 of arrays 500 that feed into a common storage or processing unit 506. FIG. 5C illustrates an array 508 of array systems 504.

In some implementations, the array of concentrators 500 may minimize or otherwise reduce the materials used as compared with a conventional large high temperature thermal solar systems and/or may leverage low cost off-the-shelf materials that were previously developed for other purposes. In these instances, each concentrator 100 may be relatively small in size having, for example, a diameter of approximately 8 feet or less. In addition, these implementations may determine the size of the reactor chamber. For example, a 50 sq foot collector 100 may collect ~5 kW of solar power. The amount of water that can be heated to disassociation may be based, at least in part, on the amount of power collected, which, in turn, may determined the reactor chamber dimensions since conductance through the chamber is strongly dependent on chamber inner dimensions.

Now, plant size is an important consideration. If a plant can be made small, it can be easily located near small to medium sized customers thereby reducing product transportation costs. But generally speaking, very small plants typically cannot compete with large plants on cost. In this case, where the manufacturing front end which includes the optical system and the chemical reactor system may be small, cost optimized and multiplexed, the optimum plant size may be set, for example, by the size and cost effectiveness of the most costly back-end processing equipment, which might be the compressor. A good compromise between compressor capital cost and throughput might occur at a compressor capacity of 80 kg per hour, for example. Using these example numbers, the smallest plant that would not suffer from plant equipment cost issues may be approximately 2000 solar reflector modules 100.

For example, a system for using solar energy to create a fuel may include an array of concentrators and a central processing unit. The array of concentrators may include a plurality of reflector support structures, a base, a reflector element, and one or more reactor elements. Each of a plurality of reflector support structures may have a bottom surface and a top surface that is substantially parabolic. The base may have a top surface configured to abut the bottom surface of each reflector support structures. The reflector element may have an outer surface configured to abut the top surface of the plurality of support elements and an inner surface that is substantially parabolic. The reflective coating may overlap at least a portion of the inner or the outer surface and is configured to focus incident solar energy. The one or more reactor elements may be configured to receive a fluid reactant and generate fuel based, at least in part, on the focused solar energy and the received fluid reactant. The plurality of conduits may be configured to pass the produced fuel to a central processing unit. The central process unit configured to regulate pressure in the one or more reactor elements and pass the produced fuel to a downstream processing system.

What is claimed is:

1. A concentrator, comprising:
a plurality of reflector support structures with each reflector support structure having a bottom surface and a top surface that is substantially parabolic;
a base having a top surface configured to abut the bottom surface of each reflector support structure;
a reflector element comprising a single contiguous piece of material, is formed independent of the plurality of reflector support structures, and has an outer surface that is substantially an elliptical paraboloid and an inner surface that is substantially an elliptical paraboloid, the outer surface is configured to abut the top surface of the plurality of reflector support structures, and the plurality of reflector support structures assist in maintaining the elliptical paraboloid of the outer surface and the elliptical paraboloid of the inner surface when the reflector element is exposed to environmental conditions; a plurality of compressible elements positioned between the plurality of reflector support structures and the reflector element; and
a reflective coating overlapping at least a portion of the inner surface or the outer surface.

2. The concentrator of claim 1, wherein the reflective coating focuses solar energy that generates sufficient heat to dissociate water into hydrogen and oxygen.

3. The concentrator of claim 1, wherein the substantially-parabolic surface comprises the outer surface or an inner surface of the reflector element.

4. The concentrator of claim 1, wherein a top surface of the base is substantially planar.

5. The concentrator of claim 1, further comprising a plurality of brackets configured to attach the plurality of reflector support structures to the base.

6. The concentrator of claim 1, wherein the plurality of reflector support structures and the reflector element comprise plastic.

7. The concentrator of claim 1, wherein the reflective coating is formed on the substantially-parabolic surface using at least one of physical vapor deposition, lamination, or plating.

8. The concentrator of claim 1, wherein the reflector element has a thickness in a range from about 30 to 120 thousandths of an inch (mils).

9. The concentrator of claim 1, wherein the reflector element is formed from at least one of blow molding, free molding, injection, molding, or thermoforming.

10. The concentrator of claim 1, wherein the reflective coating comprises metalized mylar.

11. The concentrator of claim 1, wherein the concentrator has dimensions of about 50 square feet or greater, weighs less than about 30 pounds (lbs), and collects at least about 5 kiloWatts (kW) of solar power.

12. The concentrator of claim 1, further comprising connections between the plurality of reflector support structures and the reflector element configured to be detachable.

* * * * *